United States Patent
Power et al.

(10) Patent No.: US 8,718,654 B2
(45) Date of Patent: May 6, 2014

(54) COVERAGE HOLE COMPENSATION IN WIRELESS COMMUNICATION NETWORKS

(75) Inventors: Kevin Power, West Drayton (GB); Rajni Agarwal, Northwood (GB)

(73) Assignee: Fujitsu Limited, Kawasaki (JP)

( * ) Notice: Subject to any disclaimer, the term of this patent is extended or adjusted under 35 U.S.C. 154(b) by 129 days.

(21) Appl. No.: 13/164,978

(22) Filed: Jun. 21, 2011

(65) Prior Publication Data

US 2012/0004001 A1 Jan. 5, 2012

(30) Foreign Application Priority Data

Jun. 30, 2010 (GB) .................................. 1011007.0

(51) Int. Cl.
*H04W 36/00* (2009.01)
(52) U.S. Cl.
USPC ........... 455/444; 455/436; 455/442; 455/443; 370/310.2; 370/328; 370/331
(58) Field of Classification Search
USPC ......... 455/422.1, 435.1–449; 370/310.2, 328, 370/331, 332, 334
See application file for complete search history.

(56) References Cited

U.S. PATENT DOCUMENTS

| | | | | |
|---|---|---|---|---|
| 5,095,500 | A * | 3/1992 | Tayloe et al. | 379/32.01 |
| 5,852,778 | A * | 12/1998 | Labedz | 455/423 |
| 6,400,335 | B1 * | 6/2002 | Weaver et al. | 343/853 |
| 7,327,980 | B2 * | 2/2008 | Hepsaydir | 455/11.1 |
| 7,969,937 | B2 * | 6/2011 | Iyer et al. | 370/329 |
| 8,005,030 | B2 * | 8/2011 | Stephenson et al. | 370/310 |
| 2002/0071405 | A1 * | 6/2002 | Kelley et al. | 370/332 |
| 2005/0030929 | A1 * | 2/2005 | Swier et al. | 370/338 |
| 2005/0083871 | A1 * | 4/2005 | Welnick et al. | 370/328 |
| 2005/0232223 | A1 * | 10/2005 | Muller | 370/350 |
| 2006/0073786 | A1 * | 4/2006 | Sarkar | 455/24 |
| 2006/0264174 | A1 * | 11/2006 | Moss | 455/16 |
| 2007/0135170 | A1 * | 6/2007 | Khan et al. | 455/562.1 |
| 2008/0139196 | A1 * | 6/2008 | Zhang et al. | 455/423 |
| 2009/0201801 | A1 * | 8/2009 | Ono | 370/221 |
| 2010/0020779 | A1 * | 1/2010 | Kalhan et al. | 370/338 |

(Continued)

FOREIGN PATENT DOCUMENTS

| | | |
|---|---|---|
| EP | 1 643 783 | 4/2006 |
| EP | 2 154 918 | 2/2010 |

(Continued)

OTHER PUBLICATIONS

"IEEE Standard for Local and Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1" IEEE Computer Society and the IEEE Microwave Theory and Techniques Society, Feb. 28, 2006.

(Continued)

*Primary Examiner* — Dominic E Rego
(74) *Attorney, Agent, or Firm* — Katten Muchin Rosenman LLP (57) ABSTRACT

A method of coverage hole compensation is provided in a wireless telecommunications network including a plurality of base station transmitters, each transmitter providing a coverage area for communication with user equipment, wherein a coverage hole is present within a coverage area provided by a transmitting transmitter; the method comprising selecting transmitters which are to be adjusted, including a first dominant transmitter within the coverage hole, and adjusting a transmission parameter of the selected transmitters, wherein the amount of adjustment of the selected first dominant transmitter in the coverage hole is greater than the amount of adjustment of any other selected transmitter.

12 Claims, 9 Drawing Sheets

(56) References Cited

U.S. PATENT DOCUMENTS

| | | |
|---|---|---|
| 2010/0085945 A1* | 4/2010 | Williams .................... 370/336 |
| 2010/0091746 A1 | 4/2010 | Li |
| 2010/0112996 A1 | 5/2010 | Ho et al. |
| 2010/0166048 A1* | 7/2010 | Young et al. ................ 375/220 |
| 2011/0019589 A1* | 1/2011 | Li et al. ...................... 370/255 |
| 2011/0130135 A1* | 6/2011 | Trigui ......................... 455/423 |
| 2011/0143746 A1* | 6/2011 | Lehser ......................... 455/423 |
| 2011/0149157 A1* | 6/2011 | Frerking ..................... 348/500 |
| 2011/0212720 A1* | 9/2011 | Hamalainen et al. ........ 455/423 |
| 2012/0172046 A1* | 7/2012 | Xu et al. ..................... 455/443 |

FOREIGN PATENT DOCUMENTS

| | | |
|---|---|---|
| GB | 2 446 438 | 8/2008 |
| KR | 10-2009-0120020 | 11/2009 |
| KR | 10-2010-0044378 | 4/2010 |
| WO | 2009/011640 | 1/2009 |
| WO | 2010/051838 | 5/2010 |

OTHER PUBLICATIONS

"802.16m-09/0010r1a (working document), Mar. 2008, Part 16: Air Interface for Fixed and Mobile Broadband Wireless Access Systems, Advanced Air Interface (working document)" IEEE WirelessMAN 802.16, Mar. 2008.

Great Britain Search Report dated Oct. 26, 2010, from corresponding Great Britain Application No. 1011007.0.

Great Britain Search Report dated Jan. 21, 2011, from corresponding Great Britain Application No. 1011007.0.

* cited by examiner

COVERAGE HOLE COMPENSATION IN WIRELESS COMMUNICATION NETWORKS

The present invention relates to wireless communication systems. In current mobile systems such as CDMA or OFDMA based systems including 3GPP-LTE (LTE), WCDMA, and the WiMAX standards such as IEEE 802.16e-2005 and IEEE 802.16m (16m), autonomic optimisation of the cellular network has become a major factor for operators as they look to reduce and even eliminate some of the burdensome costs associated with operating the network. With respect to the above mentioned technologies, one term applied to this type of autonomic network is a Self Optimising Network (SON), which as of now covers many different techniques, each targeting specific use cases.

In the early deployment stages of both LTE and 16m, for example, the subscriber count will be low thus making radio coverage the primary focus for operators as they dimension, plan, optimise and rollout their network. It is then normal practice, as subscriber count and demand gradually increase, that operators will shift their focus towards increasing capacity to the desired levels through additional radio planning and optimisation.

From early deployment to network maturity, operators spend a great deal of time and money maintaining key performance indicators (KPI's) through a vigorous optimisation process involving a number of radio planning engineers analytically evaluating drive test data collected from taking local measurements in an area of coverage problems and adjusting radio parameters in their planning/optimisation tools. These optimal parameters can then be exported to the appropriate network management entities within live networks responsible for holding and controlling network parameters such as, in LTE, the O&M (parameter holding entity) and EM entities (element management for base station control).

One key objective of a self-optimising Network or other modern network would therefore be to eliminate the above manual process, increasing the number of optimisations/parameter adjustments that are carried out autonomously/automatically (without human intervention) thus ultimately reducing operating expenditure (OPEX) of the network.

A key use case of SON, especially in the early stages of LTE-A (Release 10) may be coverage hole detection and compensation. Coverage holes are areas of lower user equipment connectivity at a particular location, often leading to radio link failures. Coverage hole compensation is very important for operators as they look to confidently solve any coverage issues in the early stages of deployment, since customer satisfaction during this phase is paramount. Coverage hole detection and compensation can be broken into two discrete algorithms, namely coverage hole detection and coverage hole compensation. This application focuses on the latter, and the skilled person will be aware of appropriate techniques related to the former.

Figure 1:
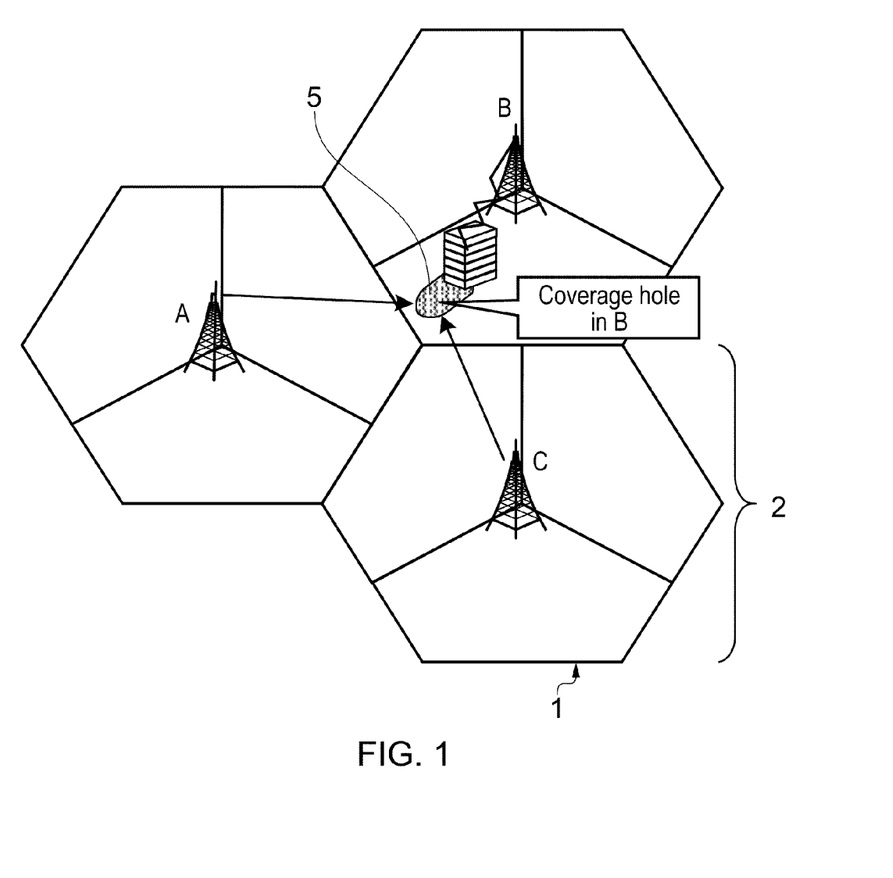
FIG. 1 shows a schematic diagram of a network in which a coverage hole is present.

Coverage problems and issues are not always related to the early stages of network deployment (pre-optimisation) but can be created by a number of factors. For example they can be linked to seasonal changes and even more so to the construction of new buildings. FIG. 1 shows a network 1, with three base stations (radio stations or eNBs, in LTE terminology) A, B and C, each providing a coverage area 2 for user equipments (also referred to as UEs, mobile stations or subscriber stations) shown as a hexagon. The base stations have three transmitters, each providing essentially one third of this coverage area (usually referred to as a cell in LTE, or a sector in WiMAX). Each transmitter may comprise one or more antennae. In the example network, a coverage hole 5 has been formed as a new building is erected. Although the building is within the coverage area of base station B, due to the extra penetration loss caused by the structure, an area of weak coverage/connectivity (in comparison with average network connectivity) has formed (referred to herein as a coverage hole). Within this coverage hole, the Received Signal Strength and Quality (RSRP/RSRQ) of cell B may be insufficient to maintain a call due to the structural penetration loss, and those for cells A and C may also be insufficient due to the distance related propagation losses. The result of this weak coverage will potentially involve terminals experiencing Radio Link Failure (RLF) in which downlink and/or uplink coverage fails. A RLF occurs due to degradation of the air interface during an ongoing voice or a data service where generally, the physical layer (L1) detects a radio link failure when it becomes unsynchronised for instance. When such a failure is found, the normal action performed by the mobile is local release of dedicated signalling links between the mobile and the network which leads to discontinuation of the voice or data application. The higher layers are then informed. This may be referred to as a dropped call, a type of outage.

The coverage hole is shown completely within the coverage area of a single transmitter, but the skilled reader will appreciate that it may occur between the coverage areas of two different transmitters which are part of the same base station or situated on different base stations, or anywhere else in the network. Moreover, the skilled reader will be aware that the reasons for and exact shape and extent of coverage holes are all variable, so that FIG. 1 depicts one of many possible scenarios.

It is known to adjust a transmission parameter of at least one transmitter in order to overcome such problems. For example, WO 2010/051838 discloses remote modification of any of tilt (also referred to as downtilt), gain, beam-width, horizontal or vertical radio patterns of one or more transmitters. However, such known algorithms (automatic methods) intended to provide for automatic adjustment have not hitherto been successfully implemented for coverage hole compensation in a practical network implementation. It is therefore desirable to provide a suitable such algorithm.

Embodiments of a method aspect of the invention provide a method of coverage hole compensation in a wireless telecommunications network including a plurality of base station transmitters, each transmitter providing a coverage area for communication with user equipment, wherein a coverage hole is present within a coverage area provided by a transmitting transmitter; the method comprising selecting transmitters which are to be adjusted, including a first dominant transmitter within the coverage hole, and adjusting a transmission parameter of the selected transmitters, wherein the amount of adjustment of the selected first dominant transmitter in the coverage hole is greater than the amount of adjustment of any other selected transmitter.

Embodiments of the invention provide an algorithm that can autonomously (without human intervention) compensate the signal strength and quality within a coverage hole by adjusting tilts (or another transmission parameter) of at least two transmitters surrounding the coverage hole. The algorithm has been engineered in a way as to prevent or at least mitigate any degradation in performance of sectors in close proximity to the coverage hole. This is achieved by making an adjustment to the most dominant transmitter and a smaller adjustment to also to at least one other transmitter. The selection of the transmitters for adjustment and adjustment may be carried out in any order. For example, selection of all transmitters for adjustment may take place before any adjustment, or the selection and adjustment for at least one further transmitter can follow the selection and adjustment of the first dominant transmitter in the coverage hole.

The inventors have realised that one of the key problems with changing a transmission parameter such as the tilt of a sector is the impact it has on neighbouring sectors. In the radio network planning phase, engineers will use tilt as the key parameter for reducing interference at cell edge or sector edge. Therefore, using tilt of a particular sector to help compensate for a coverage hole will most certainly affect the interference levels at the boundary of at least one neighbouring sector. To control this interference, the tilt (or other transmission parameter of the neighbouring sector) must also be adjusted to thus control this interference. The same is true of other types transmission parameter adjustment. In some situations, this process could go and on, gradually spreading across the whole network in similar fashion to ripples traversing through waters surface. This ripple effect will significantly increase the convergence time of the optimisation algorithm and should be avoided. The smaller adjustment of less dominant transmitters can significantly reduce such a ripple effect.

Although any of transmitter downtilt, transmission power, beam-width, and azimuth may be modified using the algorithm, the transmission parameter adjusted is preferably transmitter downtilt. The transmitter may comprise one antenna, or more than one antenna, in which case all its antenna are adjusted together in transmission parameter adjustment.

The term 'first dominant transmitter' used herein may refer to the transmitter which has the greatest chance of successful communication with a user equipment in the coverage area considered. Similarly, a second dominant transmitter is the transmitter which has the second greatest chance of successful communication with a user equipment in the coverage area considered. If there are two equally dominant transmitters, the method may select one for adjustment.

Preferably, methods of invention embodiments include initially defining a geographically limited area for consideration in the method, for example by defining a cluster of some of the sectors (or alternatively base stations) in the network, which are the only sectors which are considered in the method.

This cluster decreases the number of sectors (and thus transmitters) taken into account for selection and possible transmission parameter adjustment, and leads to a faster method.

Preferably, a cluster is defined according to a parameter which reflects geographical distance from the coverage area containing the coverage hole This distance parameter could simply be a distance of each base station/transmitter from the coverage area or transmitter/base station providing the troubled coverage area in which the coverage hole is situated. Alternatively, the distance parameter could be based on neighbour lists of base stations. For instance, the cluster could include all the neighbours of the troubled coverage area, or all these first neighbours and the neighbours of these first neighbours.

To prevent the aforementioned ripple effect and help minimise the convergence time, the algorithm may also provide a grouping mechanism whereby transmitters (for example within the cluster) are given different privileges with respect how much they can adjust their tilt. For example, each transmitter in the cluster (or each selected transmitter) may have a maximum (total and/or potentially incremental if the method is iterative) amount of transmission parameter adjustment that it can make. This maximum may be set in dependence upon the effect of the transmitter in question on the method, that is, effectively on its relationship in the method to the coverage hole. This relationship can again be based on distance from the coverage hole/troubled sector or neighbour lists, or some other factor. One possibility (which is set out in more detail below) is that the maximum adjustment is set according to whether the transmitter in question directly increases coverage within the coverage hole, is intended to compensate for such adjustment, or is intended to compensate for a compensation. Each degree of separation from the original coverage increase may have a lower maximum adjustment.

In preferable embodiments, selecting transmitters which are to be adjusted includes selecting a dominant transmitter within the coverage hole as a first adjusted transmitter, selecting a second dominant transmitter within the coverage hole, as a second adjusted transmitter; and transmission parameter adjustment includes making a first transmission parameter adjustment to the first adjusted transmitter to tend to improve coverage within the coverage hole; and making a comparatively smaller second transmission parameter adjustment to the second adjusted transmitter to compensate for the coverage change caused by the first transmission parameter adjustment.

The smaller second transmission parameter adjustment is designed to compensate for the change caused by the larger first transmission parameter adjustment without accentuating it in a way that may lead to the ripple effect. The compensation may be primarily designed to reduce interference caused by the coverage change. In the case of transmitter tilt, the first adjustment is likely to be uptilt and the second, compensating adjustment is likely to be downtilt.

In other embodiments (potentially in which greater adjustment is required) selecting transmitters which are to be adjusted further includes selecting a third adjusted transmitter as a second dominant transmitter within the coverage area provided by the second adjusted transmitter; and transmission parameter adjustment further includes making a smaller third transmission parameter adjustment than the second transmission parameter adjustment to the third adjusted transmitter to compensate for the coverage change caused by the second transmission parameter adjustment.

In these embodiments, even the smaller second adjustment is compensated, with a yet smaller third transmission parameter adjustment. The third adjustment is likely to be uptilt, to make up for coverage lost due to the second adjustment.

In still further embodiments, selecting transmitters which are to be adjusted further includes selecting a fourth adjusted transmitter as the second dominant transmitter within the coverage area provided by the third adjusted transmitter; and transmission parameter adjustment further includes making a smaller fourth transmission parameter adjustment to the fourth adjusted transmitter to compensate for the coverage change caused by the third transmission parameter adjustment.

Further adjustments may be provided as, fifth, sixth etc adjustments, each smaller in size than the previous adjustment (and like the first, second, third and fourth adjustments, opposite in tilt adjustment to the previous adjustment), until the cluster boundary is reached or no more compensation is required for interference caused by the last/outermost transmission adjustment.

The transmission parameter adjustment may be repeated, to provide an incremental method, preferably with interim connectivity derivation. In some embodiments, a connectivity parameter is derived (for example measured or calculated) in the whole coverage area considered in the method (that is the area provided by the combination of all the transmitters) before any transmission parameter adjustment and after transmission parameter adjustment to give an initial overall connectivity value and an updated overall connectivity value respectively. The same connectivity parameter may be derived in the coverage area including the coverage hole after transmission parameter adjustment to give an updated sector connectivity and these three connectivity values may be used to determine whether the adjustment is repeated.

Additionally, the connectivity parameter may be derived in the coverage area including the coverage hole before any transmission parameter adjustment to give an initial troubled sector connectivity value. This value may be used as an additional check before any adjustment to determine whether adjustment is required, for example by comparison against the initial overall connectivity.

The connectivity parameter may be a positive measure of connectivity (for example a ratio of successful to dropped/failed calls) or a negative measure of connectivity (for example outage in a simulation, perhaps expressed as a percentage/number of calculation points which fall beneath a certain threshold, such as signal strength or quality).

Preferably, the transmission parameter adjustment is repeated until connectivity in the troubled coverage area improves to a level corresponding to connectivity in the entire coverage area considered in the method. For example, adjustment may be repeated until a positive connectivity parameter in the troubled sector is equal to or exceeds an initial value (before adjustment) for the same positive connectivity parameter in the cluster (or network). Conversely, a negative connectivity parameter in the troubled sector would need to decrease to be equal to or smaller than the initial value (before adjustment) for the same negative connectivity parameter.

Preferably, the method ends if the connectivity in the entire coverage area considered in the method drops by a predetermined amount. For example, the method may end if the overall connectivity drops at all, or if it falls by a certain percentage. The method may end with a reversion to the transmission parameter value of the previous iteration, if the troubled coverage area connectivity has improved or improved by a predetermined amount. The entire method may be aborted (with no resultant adjustment] if the adjustment has not improved the troubled overage area connectivity by a sufficient amount, for example if it has not yet reached the initial overall coverage area level.

According to an embodiment of a further aspect of the invention there is provided a wireless telecommunications network operable to implement an automatic method of coverage hole compensation, the network including at least one base station, with a plurality of transmitters, each transmitter operable to provide a coverage area for communication with user equipment, wherein a coverage hole is present within a coverage area provided by a transmitting transmitter; the network further comprising a network optimisation entity operable to select for adjustment two or more of the transmitters including a first dominant transmitter within the coverage hole, and operable to instruct an adjustment to a transmission parameter of the selected transmitters, wherein the amount of adjustment of the selected first dominant transmitter in the coverage hole is greater than the amount of adjustment of any other selected transmitter.

According to an embodiment of a further aspect of the invention there is provided a base station in a wireless telecommunications network operable to implement an automatic method of coverage hole compensation, the network including a network optimisation entity and a plurality of base stations, each having a plurality of transmitters, each transmitter operable to provide a coverage area for communication with user equipment, wherein a coverage hole is present within a coverage area provided by a transmitting transmitter; the base station comprising plurality of transmitters; and a remote transmission parameter adjustor for each transmitter, operable to adjust the transmitter in dependence upon an adjustment instruction from the network optimisation entity, wherein the amount of adjustment of the transmitter is regulated according to a predefined maximum transmission parameter adjustment amount which is set in dependence upon the relationship between the transmitter in question and the coverage hole.

The method does not require human intervention while it is carried out, but algorithm parameters may be manually set in advance, for example by the network operator. The remote transmission parameter adjustor may be any appropriate automatic adjusting unit which is electrically or mechanically driven in the method without human intervention, such as a remote antenna tilt (RET).

The relationship between each transmitter which is adjusted and the coverage hole may be as previously set out.

According to an embodiment of a still further aspect of the invention there is provided a method carried out in a base station of a wireless telecommunications network to implement an automatic method of coverage hole compensation, the network including a network optimisation entity and a plurality of base stations, each having a plurality of transmitters, each transmitter providing a coverage area for communication with user equipment, wherein a coverage hole is present within a coverage area provided by a transmitting transmitter; the method in the base station comprising adjusting an transmitter in dependence upon an adjustment instruction from the network optimisation entity, wherein the amount of adjustment of the transmitter is regulated according to a predefined maximum transmission parameter adjustment amount which is set in dependence upon the relationship between the transmitter in question and the coverage hole.

According to an embodiment of a yet further aspect of the invention there is provided a network optimisation entity in a wireless telecommunications network operable to implement an automatic method of coverage hole compensation, the network including the network optimisation entity and at least one base station having a plurality of transmitters, each transmitter providing a coverage area for communication with user equipment, wherein a coverage hole is present within a coverage area provided by a transmitting transmitter; wherein the network optimisation entity is operable to select for adjustment two or more of the transmitters, including a first dominant transmitter within the coverage hole, and operable to instruct an adjustment to a transmission parameter of the selected transmitters, wherein the amount of adjustment of the selected first dominant transmitter in the coverage hole is greater than the amount of adjustment of any other selected transmitter.

The network optimisation entity may be provided as part of the base station, or one of a plurality of base stations, or may be provided as part of each base station. It may be considered to be a functional unit which may include at least a processor (used, for example, for selecting transmitters and deciding on an adjustment instruction in accordance with programming), a memory for storing relevant values for these purposes (and potentially a receiver and transmitter for communication with other parts of the network), or it may be that the functionality of the entity can be provided by some other means.

Preferably, a network optimisation entity has the functionality to transmit an instruction to the or each base station as required. However in some embodiments no such transmission is required. It may be that the controller simply issues the instruction and a separate unit or device is responsible for its transmission if required.

According to an embodiment of a still further aspect of the invention there is provided a method in a network optimisation entity in a wireless telecommunications network operable to implement an automatic method of coverage hole compensation, the network including the network optimisation entity and at least one base station having a plurality of transmitters, each transmitter providing a coverage area for communication with user equipment, wherein a coverage hole is present within a coverage area provided by a transmitting transmitter; wherein the network optimisation entity selects for adjustment two or more of the transmitters, including a first dominant transmitter within the coverage hole, and instructs an adjustment to a transmission parameter of the selected transmitters, wherein the amount of adjustment of the selected first dominant transmitter in the coverage hole is greater than the amount of adjustment of any other selected transmitter.

Finally, a computer program aspect relates to a computer program, which, when executed by a computing device, causes the computing device to become the network optimisation entity or base station as described herein or to execute a method as described herein.

In any of the above aspects, the various features may be implemented in hardware, or as software modules running on one or more processors.

The computer program may be provided in the form of a computer program product, such as a computer readable medium having stored thereon a program for carrying out any of the methods described herein. A computer program embodying the invention may be stored on a non-transitory computer-readable medium, or it could, for example, be in the form of a signal such as a downloadable data signal provided from an Internet website, or it could be in any other form. Features and preferable features of any and all of the above aspects may be combined.

Preferred features of embodiments of the present invention will now be described, purely by way of example, with reference to the accompanying drawings, in which:—

Figure 2:
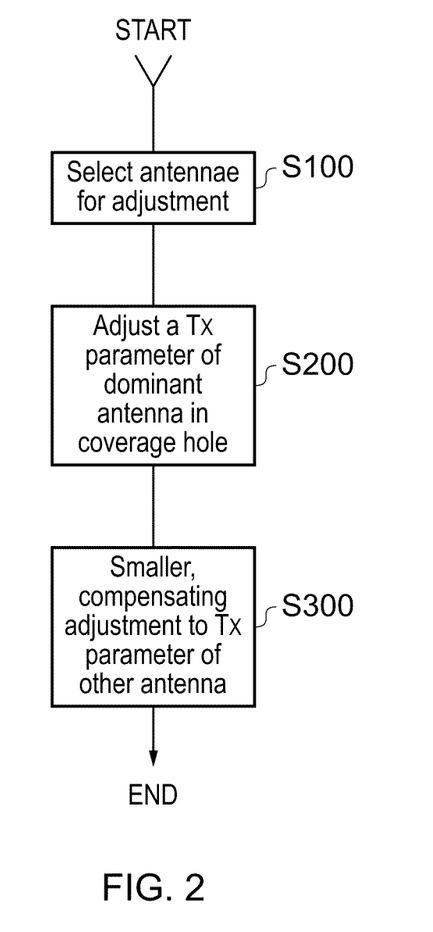
FIG. 2 shows a simple generic embodiment of the invention in the form of a flow chart.

FIG. 2 shows the overall concept of some invention embodiments. Transmitters in the network are selected for adjustment in step S100 and then the first dominant transmitter in the coverage hole is adjusted in step S200, before a smaller, compensating adjustment of at least one other selected transmitter in step S300. One or more further steps of yet smaller adjustment of other transmitters may be added if compensation is required for the compensating adjustment.

Figure 3:
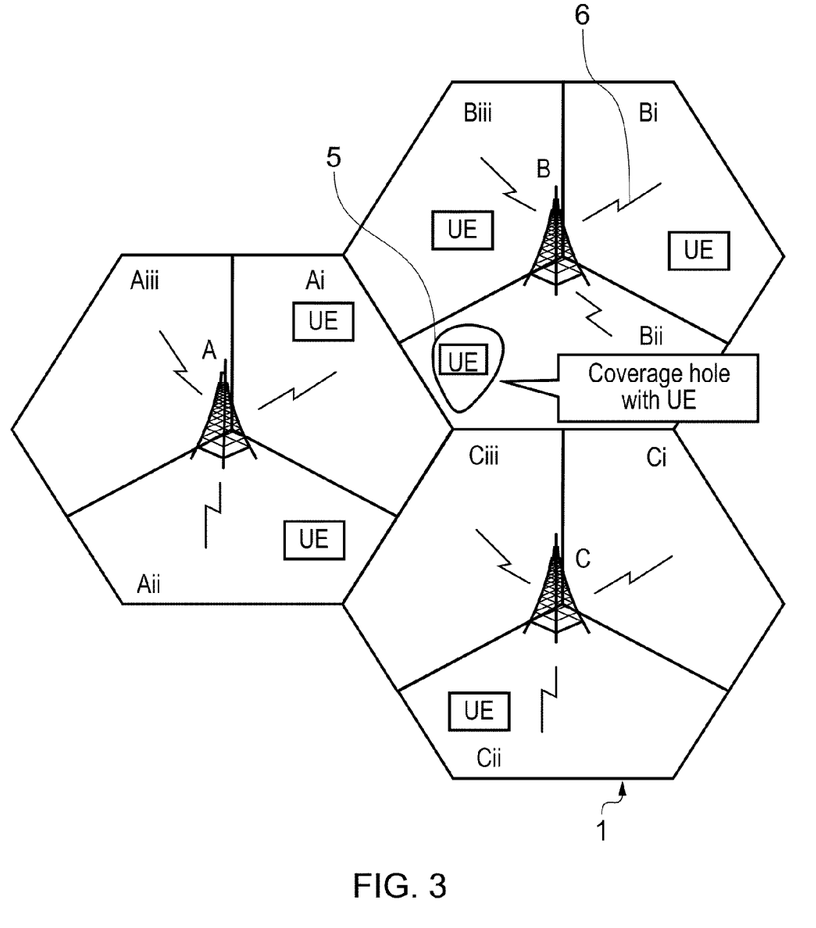
FIG. 3 is a schematic diagram of an example network with a coverage hole in troubled sector Bii.

FIG. 3 shows the same components as FIG. 1. The network further includes UEs (user equipment such as a mobile phone, PDA, laptop computer or other device) and a UE is located in the coverage hole. Base station B provides three different coverage areas, Bi, Bii and Biii, using three separate directional transmitters, 6. These different coverage areas are referred to as sectors here, and the overall coverage area of the base station may be referred to as a cell. Alternatively, a cell may be formed of sectors which are each provided by a transmitter on a different base station. This is WiMAX terminology, but the embodiments are equally applicable to the other modern techniques listed hereinbefore.

Assuming that a coverage hole has been detected, the compensation algorithm of invention embodiments is responsible for autonomously tweaking radio parameters of certain cells to help improve the signal strength (RSRP) and signal quality (RSRQ) within the troubled area. As this process is autonomous, it is essential that the new radio parameters in which the algorithm arrives do not adversely effect the RSRP and RSRQ in the sectors surrounding the coverage hole. It is well understood that possible radio parameters which can be adjusted to improve signal strength and quality are Transmission power, Antenna tilt and Antenna azimuth (direction). Changing all these parameters in parallel or even in a serial manner can complicate a compensation algorithm so the inventors have decided that it is preferable to change only one which has the greatest impact on coverage; antenna tilt.

Looking at FIG. 3 again, changing the tilt of sector Bii will not improve the situation due to a high penetration loss, created for example by a new building or buildings. On the other hand, either of sectors Ai or Ciii could potentially decrease their tilt (uptilting) as this would increase their transmission range and hence improve the signal quality and strength within the coverage hole.

Figure 4:
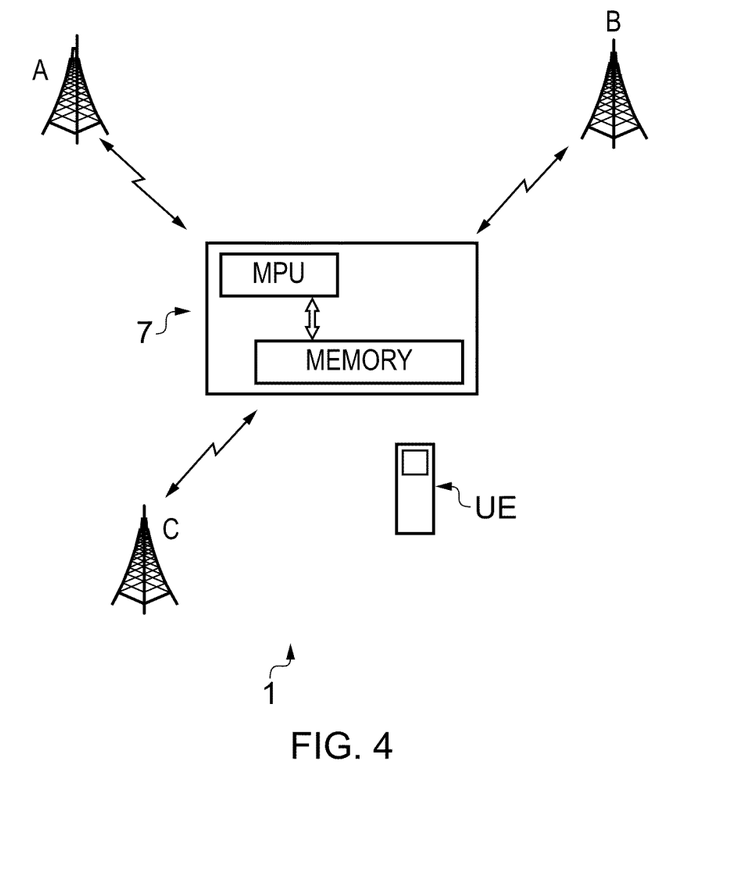
FIG. 4 is a schematic diagram of an example network including a network optimisation entity.

Invention embodiments allow adjustment of the dominant transmitter in the coverage hole, and smaller compensating adjustment of at least one other transmitter. The adjustment mechanism is controlled by a network optimisation entity 7, shown as part of a network in FIG. 4. The network optimisation entity 7 may be a SON server or other comparable network component. The network optimisation entity 7 is depicted in communication with three base stations A, B and C, for purposes of collecting network information and instructing any transmission parameter adjustment for the transmitters of those base stations to compensate for coverage holes. It includes a processor (MPU) and a memory.

As previously stated, the proposed algorithm is targeted towards the coverage hole compensation use case, whereby sectors which surround the coverage hole autonomously adjust their tilts to compensate the signal strength and quality within the hole itself.

Figure 5:
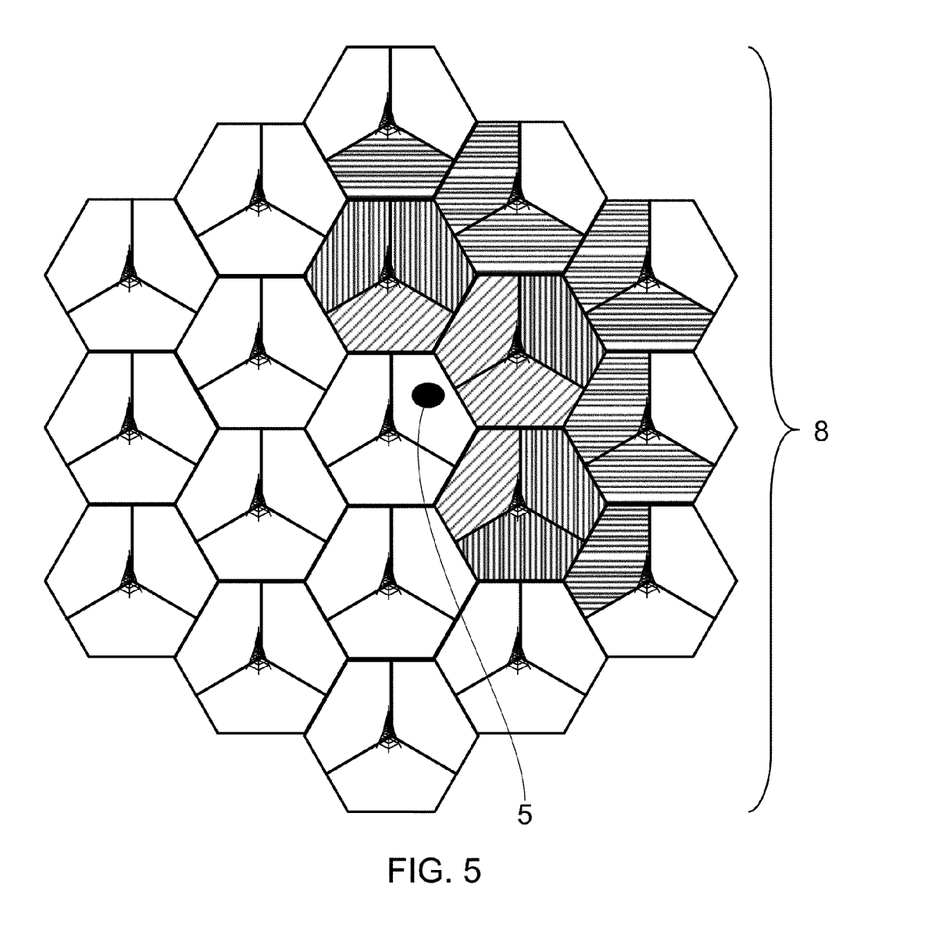
FIG. 5 illustrates a generic example where a coverage hole has been detected and a cluster of cells surrounding the hole has been formed.

FIG. 5 illustrates a generic example where a coverage hole 5 has been detected and a cluster of cells 8 surrounding the hole has been formed.

In FIG. 5, the cluster comprises of cells (base stations) that fall within a certain geographic distance d of the sector where the coverage hole is located (or of the base station transmitter in whose coverage area the coverage hole is located). Note that each cell contains three sectors and the radio parameters of each sector can be adjusted independently.

The shadings within the cluster represent the varying tilt range that sectors are allowed to apply with the general principle being;

sectors close to the coverage hole can adjust their tilts by a° (diagonal lines)

sectors further away adjust their tilts by b° where b°<a° (vertical lines)
sectors even further away adjust their tilts by c° where c°<b° (horizontal lines)

Figure 6:
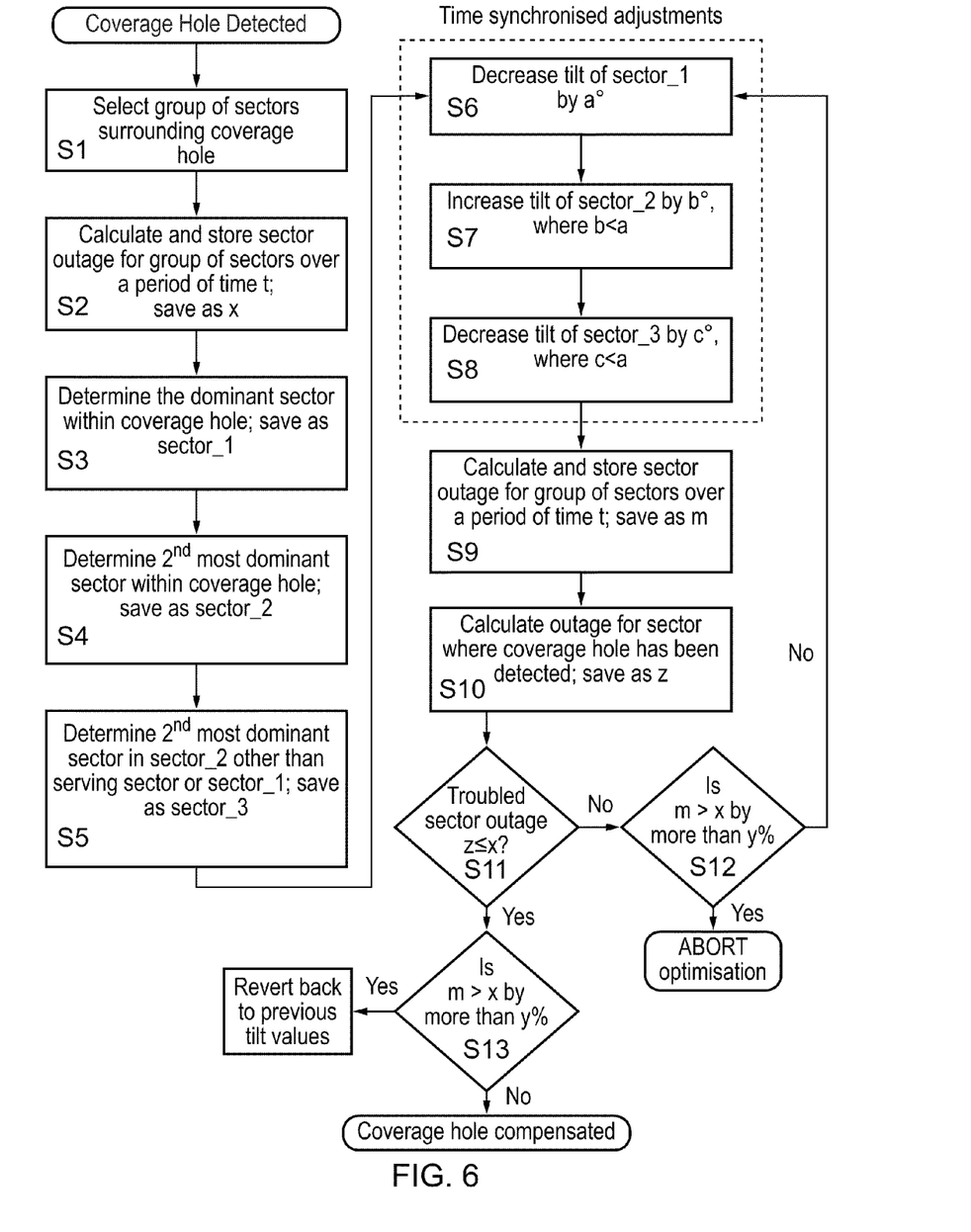
FIG. 6 is a flow chart of a specific algorithm embodying the invention.

This generic concept will firstly ensure that the ripple effect of changing tilts is minimised and secondly will help maintain cell edge throughput within the cluster and ultimately reduce the convergence time of the algorithm. As will be seen from the following, the tilt permissions are likely to be set in a slightly more complex manner, (which takes into account pathloss), the transmitter/sector which is dominant in the coverage hole being allowed the largest tilt adjustment and compensating adjustments in further sectors becoming progressively smaller Now, looking at the specific compensation algorithm of one invention embodiment which is depicted in FIG. 6 in the form of a flowchart, we can see how the clustering is a very important first step to the algorithm. In the flowchart, the cluster is formed of sectors, but it may be formed of base stations with a similar effect. Namely, the clustering reduces the measurement processing/filtering overhead as only the data from these cells/sectors is required to quantify the gains of the algorithm and evaluate the impact on surrounding cells/sectors. Secondly, it helps provide a means for setting different tilt permissions within the cluster which in turn will help minimise the ripple effect.

Below we describe each step of the algorithm in more detail.

S1 Select a group of sectors surrounding the coverage hole: —the sector where the coverage hole has been detected will most likely be tagged as a troubled sector which can then be used as a centre point for the formation of the cluster. The number of tiered sectors surrounding the troubled sector is implementation dependant but should be large enough to support the anti-ripple concept (see for example FIG. 5).

S2 Calculate and store the sector outage for the cluster of sectors over period of time t: —in simulation terms, the sector outage would be defined as a percentage of calculation points that fall below a certain signal strength and/or quality threshold. In live network terms this could be defined at the ratio of successful calls to dropped calls. This outage can be captured almost immediately from a monte-carlo simulator but may take several hours/days/weeks within a live network. This time is defined as t and will most likely be proportional to the number of subscribers in the network. Following this collection of data, will be a filtering, averaging and statistical processing procedure but the details of this stage are outside the scope of this invention.

S3 Determine the dominant sector within coverage hole: —this stage will involve direct analysis of the Serving sector and neighbour sectors (with respective RSRP and RSRQ) before and after the RLF. This approach assumes that the UE is logging measurements on a rolling buffer. This data will then be sent back to the network following the RLF (i.e., when the connection is re-established). Simply applying a statistical mode to this data (to see which sector appears the most in the data) will allow the dominant sector to be determined. For the following steps of the algorithm this sector ID should be saved as sector_1. Objective: —to make this sector most dominant by improving the signal strength and quality within the coverage hole to such levels that will help prevent radio link failures.

S4 Determine $2^{nd}$ most dominant sector within coverage hole: —this stage is very similar to step 3 but instead finds the second most dominant sector. For the following stages of the algorithm this sector ID should be saved as sector_2. Objective: —to reduce the interference to sector_1 within the coverage hole thus improving the signal quality (RSRQ) of sector_1.

S5 Determine $2^{nd}$ most dominant sector in sector_2 other than serving sector or sector_1: —this stage will involve direct analysis of the $2^{nd}$ most dominant sector (and respective RSRP/RSRQ's) in sector_2. For the following stages of the algorithm this sector ID should be saved as sector_3. Objective: —to help minimise the negative impact of modifying the tilt of sector_2.

S6 Decrease tilt of sector_1 by a°: —This step will help ensure that sector_1 becomes the dominant sector within the coverage hole, where the signal strength and quality are at sufficient levels as to prevent a radio link failure. Decreasing the tilt (i.e., uptilting) will ensure the range of this sector in increased.

S7 Increase tilt of sector_2 by b° (where b°<a°): —This step will help decrease interference to sector_1 therefore improving the signal quality (RSRQ) of sector_1 within the coverage hole. It should be noted that b°<a° as this proves a very useful first step in reducing the 'ripple' effect of changing tilts.

S8 Decrease tilt of sector_3 by c° (where c°<b°): —It is understood that step 7 (downtilting sector_2) may introduce an unwanted negative effect at the boundary of neighbouring sectors (i.e., poor sector edge coverage). To help prevent this from occurring, it is advisable to decrease tilt (uptilt) of sector_3 by c° (where c°<b°) as this will help counter act any adverse effect caused by step 7. It should also be noted that c°<b° as this will further help reduce the 'ripple' effect of changing tilts.

Note, the adjustments in S6, S7 and S8 should be time synchronised as this will help prevent any unwanted periods of poor coverage.

S9 Calculate and store the sector outage for the cluster of sectors over period of time t: —Same as step 2 but saved as m for future steps of the algorithm.

S10 Calculate outage for sector where coverage hole has been detected: —as the precise location of the coverage hole is not available, only the troubled sector's outage can be used.

S11 Troubled sector outage (z) less than or equal to (x): —In this case (x) is calculated from step 2 and is used as a benchmark with respect to (z) which is calculated in step 10.

S12 If NO to step 11, check if sector outage for cluster of sectors has increased by more than y %: —This step introduces a provision for ensuring that the outage of sectors belonging to the cluster is not adversely effected by the change in tilts. If more than y % then the optimisation is aborted. If less than y %, repeat steps 6-10.

S13 If YES to step 11, check if sector outage for cluster of cells has increased by more than y %: —This step introduces a provision for ensuring that the outage of sectors belonging to the cluster is not adversely effected by the change in tilts. If more than y % then the sectors revert back to their previous tilt values. If less than y %, optimisation is complete with current tilt values.

Note, all algorithm parameters, a, b, c, m, x, y, z, and t will be implementation specific and will most likely be configured by the network operator.

Figure 7:
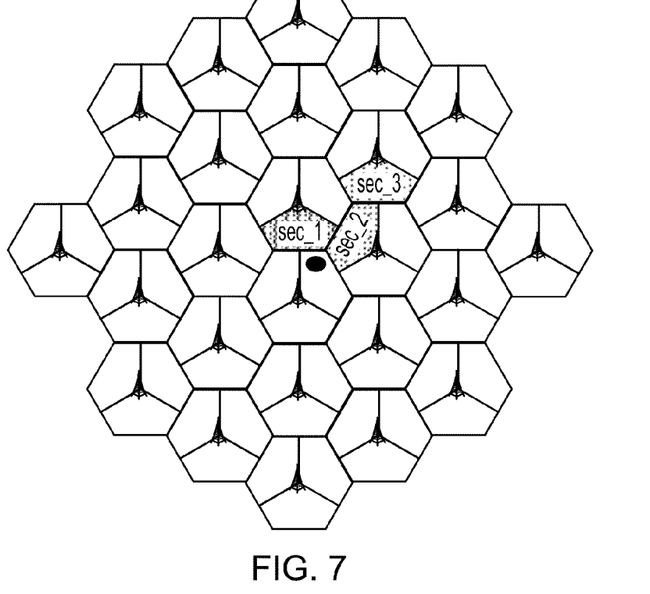
FIG. 7 is a schematic geographic diagram of tilt adjustment in three sectors.
Figure 8:
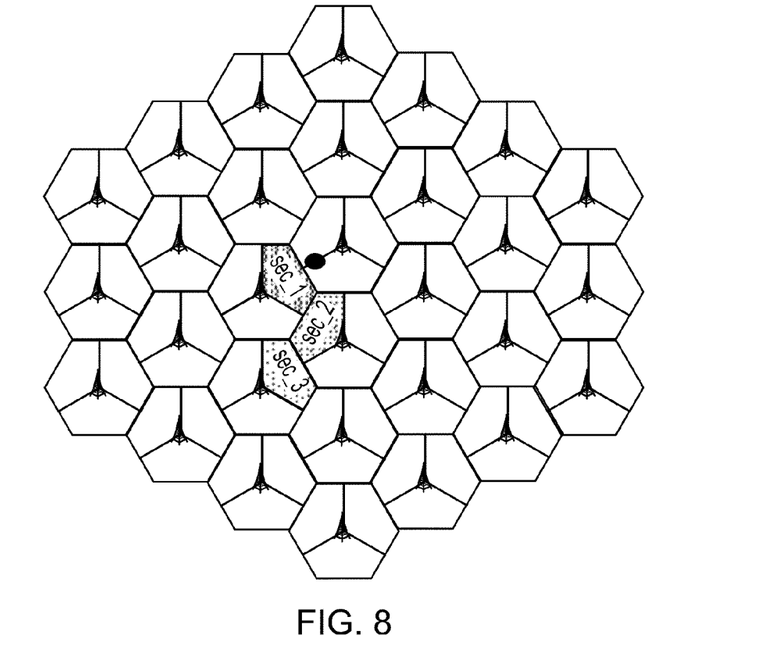
FIG. 8 is a schematic geographic diagram of tilt adjustment in three sectors.

By using an anti-Ripple concept in conjunction with the compensation algorithm we can illustrate two implementation examples in the form of FIGS. 7 and 8.

FIG. 7 illustrates an example where a coverage hole has been detected close to the cell edge and a cluster of cells surrounding the hole has been formed. Uptilting Sec_1 by a° and downtilting Sec_2 by b° will help reduce Sec_2 to Sec_1 interference within the coverage hole thus improving the RSRP but more importantly increasing the RSRQ. To help combat any negative effect of changing Sec__2 transmitter tilt, Sec__3 will uptilt by c° as this should help improve the coverage at the boundary of Sec__2 and Sec__3.

FIG. 8 illustrates a similar example where this time the coverage hole has been detected on a sectors edge and as per the algorithm a cluster of cells surrounding the hole has been formed. Uptilting Sec__1 by a° and downtilting Sec__2 by b° will help reduce Sec__2 to Sec__1 interference within the coverage hole thus improving the RSRP but more importantly increasing the RSRQ. To help combat any negative effect of changing Sec__2 transmitter tilt, Sec__3 will uptilt by c° as this should help improve the coverage at the boundary of Sec__2 and Sec__3.

Simulation of a coverage hole clearly within one sector in a network was used to illustrate the gains of the above proposed algorithm in terms of signal strength and quality before and after the optimization. In this situation we expect the transmitter tilts to change the most and therefore potentially introduce a negative effect on surrounding sectors.

Simulation of before and after signal strength and quality within the coverage hole demonstrated significant gains as a result of the optimisation algorithm. We can therefore confidently say that the coverage hole was compensated as terminals will be capable of establishing a reasonable connection within that area.

To understand the impact on surrounding sectors as a result of this algorithm, the before and after signal strength and quality within the cluster of cells was investigated and there was no appreciable negative overall effect on those cells within the cluster. This also confirms that the anti-ripple mechanism is indeed playing an important role in this optimisation algorithm.

Figure 9:
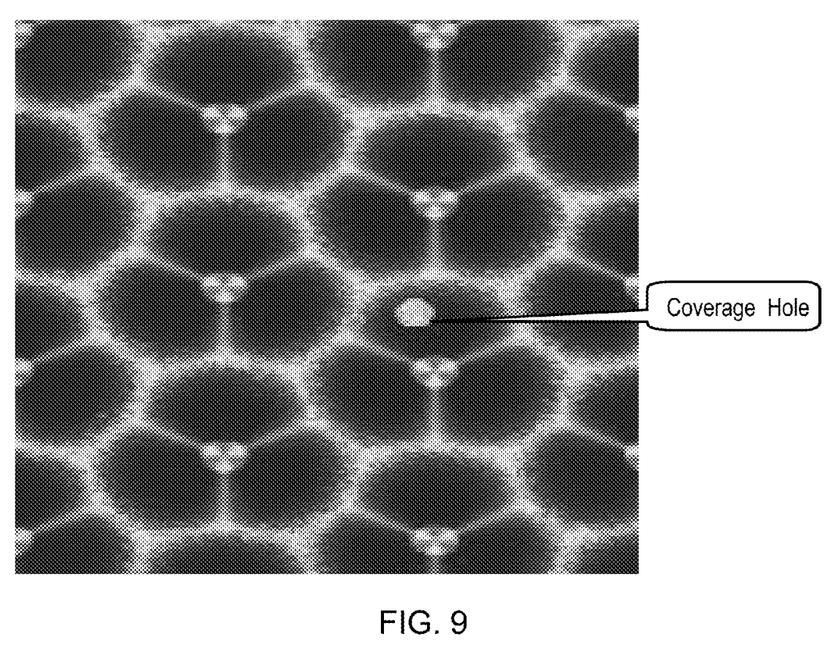
FIGS. 9 and 10 simple show a RSRQ coverage map before and after optimisation according to invention embodiments.
Figure 10:
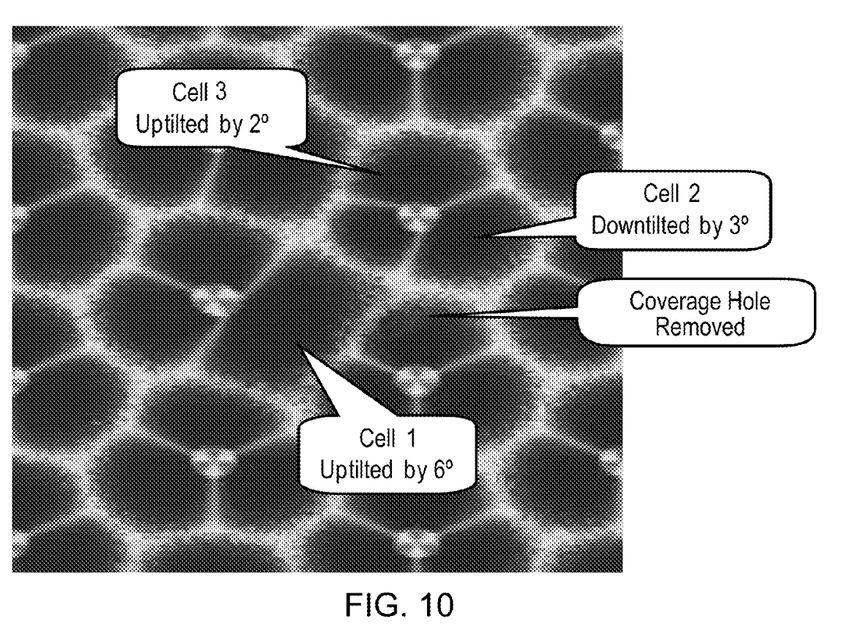

FIGS. 9 and 10 simple show the RSRQ coverage map before and after the optimisation. From FIG. 10 you can clearly see how 3 sectors adjusted their transmitter tilts as part of the algorithm.

Table 1 shows examples of the iterations of the algorithm and for each we show the tilt values of sector 1, sector 2 and sector 3. There are only 8 iterations of the algorithm before the algorithm converges. Sector 1 is adjusted by 1°, Sector 2 is adjusted by 0.5° and Sector 3 is adjusted by 0.4°.

TABLE 1

Algorithm iterations

| Iteration | sector 1 | sector 2 | sector 3 | Coverage Hole outage |
|---|---|---|---|---|
| Initial | 15 | 15 | 15.0 | 100 |
| 1 | 14 | 15.5 | 14.6 | 100 |
| 2 | 13 | 16 | 14.2 | 100 |
| 3 | 12 | 16.5 | 13.8 | 100 |
| 4 | 11 | 17 | 13.4 | 92.5 |
| 5 | 10 | 17.5 | 13.0 | 77.5 |
| 6 | 9 | 18 | 12.6 | 40 |
| 7 | 8 | 18.5 | 12.2 | 25 |
| 8 | 7 | 19 | 11.8 | 12.5 |

With respect to the algorithm, the initial cluster outage x (Step 2) was 17.6799% and the final cluster outage m was 17.8656% so it is clear the optimisation process has barely effected the sector outage of surrounding cells and thus again proves the anti-ripple concept.

Embodiments of the invention may provide the following benefits:

an algorithm whereby a cellular network can autonomously compensate the signal strength and quality within a coverage hole by adjusting the transmitter tilt of several sectors surrounding the hole.

a grouping mechanism that reduces the measurement processing/filtering overhead as only the data from these cells is required to quantify the gains of the algorithm and evaluate the impact on surrounding cells.

The grouping mechanism may also help to provide a means for setting different tilt permissions within the cluster which in turn helps minimise the ripple effect caused by changing tilts in a cellular network.

One specific algorithm provisions several check conditions that will prevent the group of cells outage exceeding an implementation defined/specific threshold.

Significantly reduced convergence time compared to other random and genetic algorithms.

The invention claimed is:

1. A method of coverage hole compensation in a wireless telecommunications network including a plurality of base station transmitters, each transmitter providing a coverage area for communication with user equipment, wherein a coverage hole is present within a coverage area provided by a transmitting transmitter, the method comprising:

selecting transmitters which are to be adjusted, including a first dominant transmitter within the coverage hole, and adjusting a transmission parameter of the selected transmitters, wherein the amount of adjustment of the selected first dominant transmitter in the coverage hole is greater than the amount of adjustment of any other selected transmitter, wherein:

selecting transmitters which are to be adjusted includes
selecting a dominant transmitter within the coverage hole as a first adjusted transmitter,
selecting a second dominant transmitter within the coverage hole, as a second adjusted transmitter; and
transmission parameter adjustment includes
making a first transmission parameter adjustment to the first adjusted transmitter to tend to improve coverage within the coverage hole; and
making a comparatively smaller second transmission parameter adjustment to the second adjusted transmitter to compensate for the coverage change caused by the first transmission parameter adjustment.

2. A method according to claim 1, wherein the wireless telecommunications network includes a plurality of base stations, each base station having a plurality of transmitters and preferably wherein the transmitting transmitter and first dominant transmitter belong to different base stations.

3. A method according to claim 2, further comprising initially defining a cluster of some of the base stations or transmitters in the network, which are the only base stations or transmitters which are considered in the method.

4. A method according to claim 3, wherein the cluster of base stations or transmitters is defined according to a parameter which reflects geographical distance from the coverage area containing the coverage hole.

5. A method according to claim 1, wherein each transmitter has a maximum total amount of transmission parameter adjustment that it can make.

6. A method according to claim wherein
selecting transmitters which are to be adjusted further includes
selecting a third adjusted transmitter as a second dominant transmitter within the coverage area provided by the second adjusted transmitter; and
transmission parameter adjustment further includes:
making a smaller third transmission parameter adjustment than the second transmission parameter adjustment to the third adjusted transmitter to compensate for the coverage change caused by the second transmission parameter adjustment.

7. A method according to claim 1, wherein transmission parameter adjustment is repeated until connectivity in the coverage area containing the coverage hole improves to a level corresponding to connectivity in the entire coverage area considered in the method.

8. A method according to claim 1, wherein the method ends if connectivity in the entire coverage area considered in the method drops by a predetermined amount.

9. A method of coverage hole compensation in a wireless telecommunications network including a plurality of base station transmitters, each transmitter providing a coverage area for communication with user equipment, wherein a coverage hole is present within a coverage area provided by a transmitting transmitter, the method comprising:
   selecting transmitters which are to be adjusted, including a first dominant transmitter within the coverage hole, and adjusting a transmission parameter of the selected transmitters, wherein the amount of adjustment of the selected first dominant transmitter in the coverage hole is greater than the amount of adjustment of any other selected transmitter, wherein
   a connectivity parameter is derived in the whole coverage area considered in the method before any transmission parameter adjustment and after transmission parameter adjustment to give an initial overall connectivity value and an updated overall connectivity value respectively;
   the same connectivity parameter is derived in the coverage area including the coverage hole after transmission parameter adjustment to an updated sector connectivity value and wherein
   these three connectivity values are used to determine whether the adjustment is repeated.

10. A wireless telecommunications network operable to implement an automatic method of coverage hole compensation, the network including at least one base station, with a plurality of transmitters, each transmitter operable to provide a coverage area for communication with user equipment, wherein a coverage hole is present within a coverage area provided by a transmitting transmitter, the network further comprising:
   a network optimisation entity operable to select for adjustment two or more of the transmitters, including a first dominant transmitter within the coverage hole, and operable to instruct an adjustment to a transmission parameter of the selected transmitters, wherein the amount of adjustment of the selected first dominant transmitter in the coverage hole is greater than the amount of adjustment of any other selected transmitter, wherein:
   selecting transmitters which are to be adjusted includes
   selecting a dominant transmitter within the coverage hole as a first adjusted transmitter,
   selecting a second dominant transmitter within the coverage hole, as a second adjusted transmitter; and
   transmission parameter adjustment includes
   making a first transmission parameter adjustment to the first adjusted transmitter to tend to improve coverage within the coverage hole; and
   making a comparatively smaller second transmission parameter adjustment to the second adjusted transmitter to compensate for the coverage change caused by the first transmission parameter adjustment.

11. A network optimisation entity in a wireless telecommunications network operable to implement an automatic method of coverage hole compensation, the network including the network optimisation entity and at least one base station having a plurality of transmitters, each transmitter providing a coverage area for communication with user equipment, wherein a coverage hole is present within a coverage area provided by a transmitting transmitter, wherein:
   the network optimisation entity is operable to select for adjustment two or more of the transmitters, including a first dominant transmitter within the coverage hole, and operable to instruct an adjustment to a transmission parameter of the selected transmitters, wherein the amount of adjustment of the selected first dominant transmitter in the coverage hole is greater than the amount of adjustment of any other selected transmitter, wherein:
   selecting transmitters which are to be adjusted includes
   selecting a dominant transmitter within the coverage hole as a first adjusted transmitter,
   selecting a second dominant transmitter within the coverage hole, as a second adjusted transmitter; and
   transmission parameter adjustment includes
   making a first transmission parameter adjustment to the first adjusted transmitter to tend to improve coverage within the coverage hole; and
   making a comparatively smaller second transmission parameter adjustment to the second adjusted transmitter to compensate for the coverage change caused by the first transmission parameter adjustment.

12. A method in a network optimisation entity in a wireless telecommunications network operable to implement an automatic method of coverage hole compensation, the network including the network optimisation entity and at least one base station having a plurality of transmitters, each transmitter providing a coverage area for communication with user equipment, wherein a coverage hole is present within a coverage area provided by a transmitting transmitter, wherein:
   the network optimisation entity selects for adjustment two or more of the transmitters, including a first dominant transmitter within the coverage hole, and instructs an adjustment to a transmission parameter of the selected transmitters, wherein the amount of adjustment of the selected first dominant transmitter in the coverage hole is greater than the amount of adjustment of any other selected transmitter, wherein:
   selecting transmitters which are to be adjusted includes
   selecting a dominant transmitter within the coverage hole as a first adjusted transmitter,
   selecting a second dominant transmitter within the coverage hole, as a second adjusted transmitter; and
   transmission parameter adjustment includes
   making a first transmission parameter adjustment to the first adjusted transmitter to tend to improve coverage within the coverage hole; and
   making a comparatively smaller second transmission parameter adjustment to the second adjusted transmitter to compensate for the coverage change caused by the first transmission parameter adjustment.

* * * * *